United States Patent
Na et al.

(10) Patent No.: US 9,942,955 B2
(45) Date of Patent: Apr. 10, 2018

(54) LED LAMP USING SWITCHING CIRCUIT

(71) Applicant: AMOSENSE CO., LTD., Chungcheongnam-do (KR)

(72) Inventors: Won-San Na, Seoul (KR); Jin-Pyo Park, Seoul (KR); Bo-Hyeon Han, Gyeonggi-do (KR); Cheol-Seung Han, Seoul (KR)

(73) Assignee: AMOSENSE CO., LTD. (CHEONAN THE FOURTH LOCAL INDUSTRIAL COMPLEX), Chungcheongnam-do (KR)

( * ) Notice: Subject to any disclaimer, the term of this patent is extended or adjusted under 35 U.S.C. 154(b) by 0 days.

(21) Appl. No.: 15/302,657

(22) PCT Filed: Apr. 10, 2015

(86) PCT No.: PCT/KR2015/003607
§ 371 (c)(1),
(2) Date: Dec. 27, 2016

(87) PCT Pub. No.: WO2015/156633
PCT Pub. Date: Oct. 15, 2015

(65) Prior Publication Data
US 2017/0171924 A1 Jun. 15, 2017

(30) Foreign Application Priority Data

Apr. 10, 2014 (KR) .......... 10-2014-0043170
Aug. 7, 2014 (KR) .......... 10-2014-0101874

(51) Int. Cl.
H05B 33/08 (2006.01)
F21V 25/02 (2006.01)
F21Y 115/10 (2016.01)

(52) U.S. Cl.
CPC .......... H05B 33/0815 (2013.01); *F21V 25/02* (2013.01); *F21Y 2115/10* (2016.08)

(58) Field of Classification Search
CPC H05B 33/0815; H05B 33/08; H05B 33/0803; H05B 33/0806; H05B 33/0809;
(Continued)

(56) References Cited

U.S. PATENT DOCUMENTS

2014/0152184 A1* 6/2014 Tomiyama ......... H05B 33/0818
315/186

FOREIGN PATENT DOCUMENTS

CN 103650642 A 3/2014
JP 2004-192833 A 7/2004
(Continued)

*Primary Examiner* — Alexander H Taningco
*Assistant Examiner* — Seokjin Kim
(74) *Attorney, Agent, or Firm* — Baker & Hostetler LLP

(57) ABSTRACT

Disclosed is an LED lamp using a switching circuit, configured to prevent occurrence of electric shock caused by a contact of a conductive metal or the human body by arranging the switching circuit between a first rectifier circuit and an LED circuit. The disclosed LED lamp using a switching circuit connects the switching circuit to at least one line among a plurality of lines connecting a rectifier circuit and an LED circuit, wherein the switching circuit may comprise: a switching element comprising at least one from among an SCR, a TRIAC, a TR, and an FET; and a driving element comprising at least one from among a capacitor, a TVS, a ZENER, a SIDAC, a resistance, and an inductor.

4 Claims, 10 Drawing Sheets

(58) Field of Classification Search
CPC ............ H05B 33/0812; H05B 33/0818; H05B 33/0827; H05B 33/083; H05B 33/0842; H05B 33/0845; H05B 33/0848; H05B 33/0851; H05B 33/0854; H05B 33/0857; H05B 33/086; H05B 33/0869; H05B 33/0872; H05B 33/0875; H05B 33/0887; H05B 33/089; H05B 33/0896; H05B 37/00; H05B 37/02; H05B 37/0209; H05B 37/0218; H05B 37/0227; H05B 37/0236; H05B 37/0245; H05B 37/0254; H05B 37/0263; H05B 37/0272; H05B 37/0281; H05B 37/03; H05B 39/04; H05B 39/041; H05B 39/042; H05B 39/044; H05B 39/048; H05B 39/08; H05B 39/081; H05B 39/28; H05B 39/3921; H05B 39/3924
See application file for complete search history.

(56) References Cited

FOREIGN PATENT DOCUMENTS

| | | | |
|---|---|---|---|
| JP | 3929885 B2 | 6/2007 | |
| JP | 2013-122918 A | 6/2013 | |
| JP | 2013-219857 A | 10/2013 | |
| KR | 1020110039608 A * | 10/2009 | ............... H02H 3/16 |
| KR | 10-2009-0116259 A | 11/2009 | |
| KR | 10-0958435 B1 | 5/2010 | |
| KR | 10-2011-0039608 A | 4/2011 | |
| KR | 10-2013-0142904 A | 12/2013 | |

* cited by examiner

| Vin [Vac] | NORMAL STATE [Vpeak] | | ELECTRIC SHOCK STATE [Vpeak] | |
|---|---|---|---|---|
| | V1 | V2 | V1 | V2 |
| 200 | 282.8 | X | 254.5 | 28.3 |
| 220 | 311.1 | X | 280.0 | 31.1 |
| 240 | 339.4 | X | 305.4 | 33.9 |

LED LAMP USING SWITCHING CIRCUIT

TECHNICAL FIELD

The present invention relates, in general, to an LED lamp using a switching circuit and, more particularly, to an LED lamp using a switching circuit for preventing an electric shock attributable to contact of human body with the LED lamp when the LED lamp is installed.

This application is a National Stage of International patent application PCT/KR2015/003607, filed on Apr. 10, 2015, which claims the benefit of Korean Patent Application No. 10-2014-0043170, filed Apr. 10, 2014, and No. 10-2014-0101874, filed Aug. 7, 2014, which are hereby incorporated by reference in their entirety into this application.

BACKGROUND ART

Generally, fluorescent lamps, which are economical and have high illumination intensity, have been used as lighting equipment in houses, buildings, factories and the like. A fluorescent lamp is a lighting device that operates in such a way that high voltage therein causes an electrical discharge and ultraviolet light generated therefrom reacts with fluorescent material painted on the inner side of the lamp, whereby visible light is emitted. Here, as a lighting system for a fluorescent lamp, there are a magnetic ballast lighting system using a magnetic ballast and a starter (a glow starter or a rapid starter) and an electronic ballast lighting system using an electronic ballast.

Fluorescent lamps are used as lighting devices for enabling products or articles exhibited or displayed in shopping malls, exhibition centers and the like to look vivid and beautiful, or as various forms of lighting devices for interior design, but they are problematic in that it is difficult to acquire desired brightness for a given amount of power consumption.

Recently, in order to solve this problem, the use of LED lamps, which operate at low voltage and have a long lifespan, low power consumption, fast response time, high resistance to shocks, and reduced size and weight, is increasing. Generally, an LED lamp is installed in the housing of a lamp, in which a fluorescent lamp has typically been installed. Here, the housing of the lamp includes a ballast therein.

However, if no protection circuit for preventing overcurrent and overvoltage is installed in the ballast in the light fixture, when a user installs an LED lamp, the user may contact the terminal of the LED lamp, which is connected with the ballast, whereby the user may be subjected to an electric shock. Specifically, if no protection circuit for preventing overcurrent and overcharge is included in the ballast, if any one of the terminals of one base of the LED lamp is connected to the ballast, the terminals of the opposite base of the LED lamp are shorted, and when the user touches the shorted terminals, the user may be subjected to an electric shock.

Also, in a certain LED lamp, a mechanical switch is installed in a terminal unit, and power is applied only when all terminals on both sides of the LED lamp are connected to the light fixture, whereby an electric shock is prevented. However, the LED lamp using a mechanical switch is problematic in that contact failure may occur depending on the degree of vibration and coupling, and thus power may not be stably supplied to the LED lamp.

DISCLOSURE

Technical Problem

The present invention has been proposed to solve the above-mentioned problem, and an object of the present invention is to provide an LED lamp using a switching circuit, in which the switching circuit is arranged between a first rectifier circuit and an LED circuit, whereby the occurrence of an electric shock, attributable to the contact of a human body part or conductive metal with the LED lamp, may be prevented.

Technical Solution

In order to accomplish the above object, an LED lamp using a switching circuit according to an embodiment of the present invention connects the switching circuit with a least one of multiple lines that connect a rectifier circuit and an LED circuit.

Here, the switching circuit may be configured to include a switching element, which includes at least one of an SCR, a TRIAC, a TR and a FET, and a driving element, which includes at least one of a condenser, a TVS diode, a ZENER diode, a SIDAC switch, a resistor and an inductor.

Advantageous Effects

According to the present invention, because the LED lamp using a switching circuit is configured such that the switching circuit is arranged between a first rectifier circuit and an LED circuit, the occurrence of an electric shock, attributable to the contact of a human body or conductive metal with the LED lamp, may be prevented.

Also, because the LED lamp using a switching circuit is configured such that the switching circuit is arranged between a first rectifier circuit and an LED circuit, the LED lamp may be stably operated by switching a DC line having little ripple, which is connected to the rectifier.

Also, because the LED lamp using a switching circuit is configured such that the switching circuit is arranged between a first rectifier circuit and an LED circuit, operational characteristics may be improved when input voltage has a wide range.

Also, because the LED lamp using a switching circuit is configured such that the switching circuit is arranged between a first rectifier circuit and an LED circuit, it is possible to solve problems related to contact, such as a contact failure resulting from vibration, deterioration and the like, which occur in a conventional LED lamp using a mechanical switch.

Also, because the LED lamp using a switching circuit is configured such that the switching circuit is arranged between a first rectifier circuit and an LED circuit, a circuit for protection from electric shocks may be simply configured, and the function of protection from electric shocks may be improved.

Also, because the LED lamp using a switching circuit is configured such that the switching circuit is arranged between a first rectifier circuit and an LED circuit, the operation of a switching element may be controlled by controlling a cut-off voltage depending on a clamping voltage through a driving element.

Also, because the LED lamp using a switching circuit is configured such that the switching circuit is arranged between a first rectifier circuit and an LED circuit, the function of protection from electric shocks may be improved compared to a conventional LED lamp, and flickering may be prevented.

MODE FOR INVENTION

Figure 1:
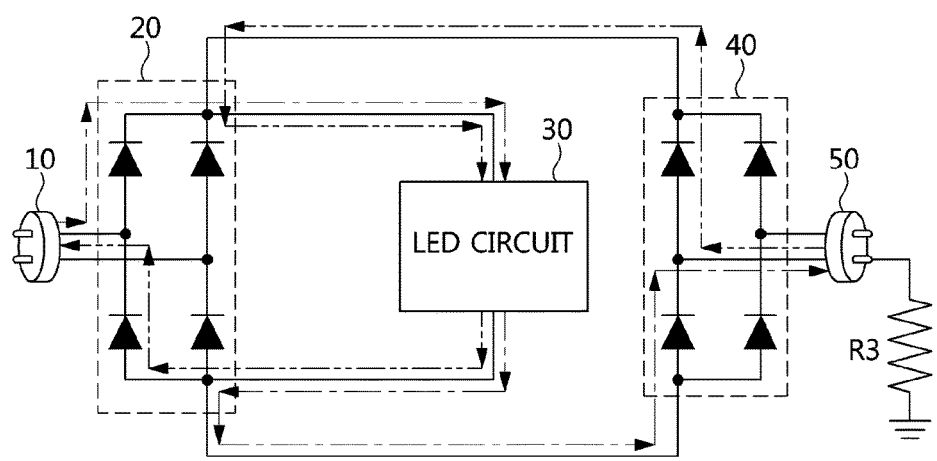
FIG. 1 is a view for describing a general LED lamp.

Hereinafter, a preferred embodiment of the present invention is described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Figure 2:
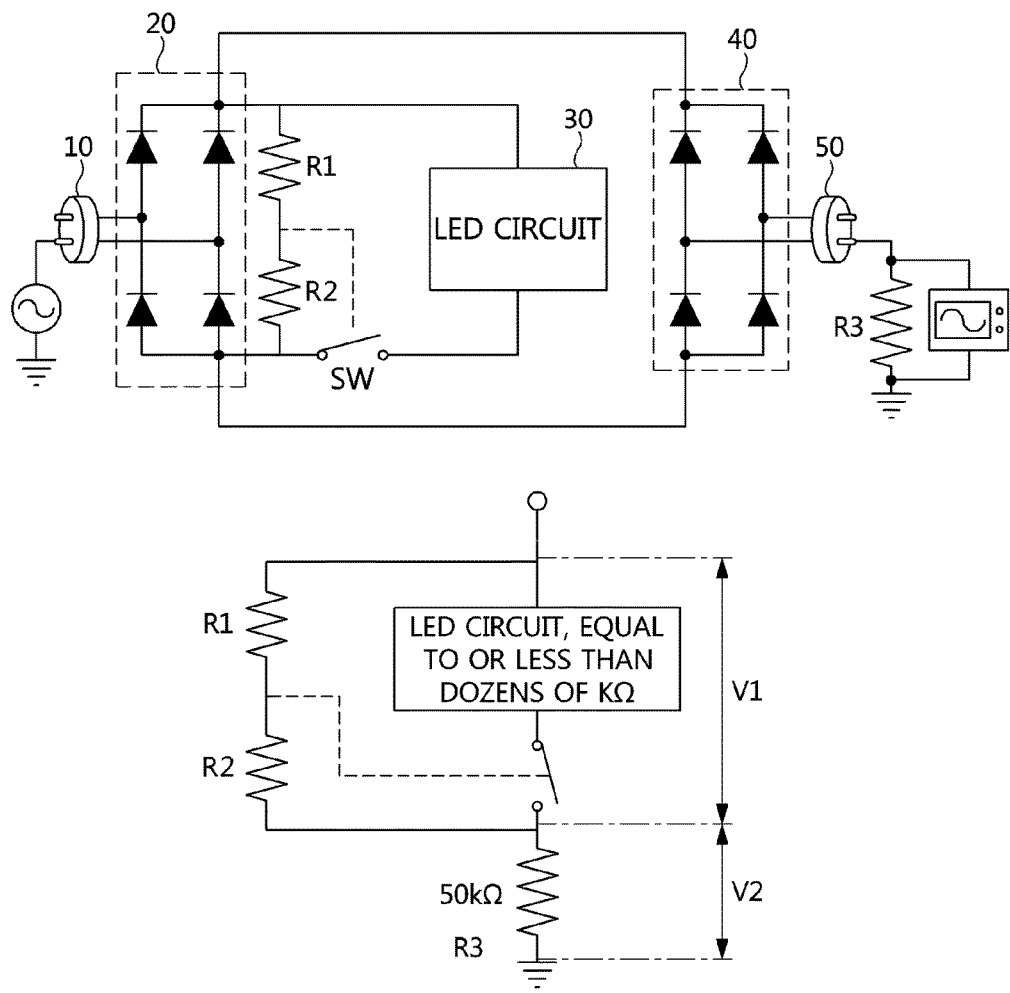
FIG. 2 is a view for describing a conventional LED lamp using an electric circuit.
Figures 3, 4:
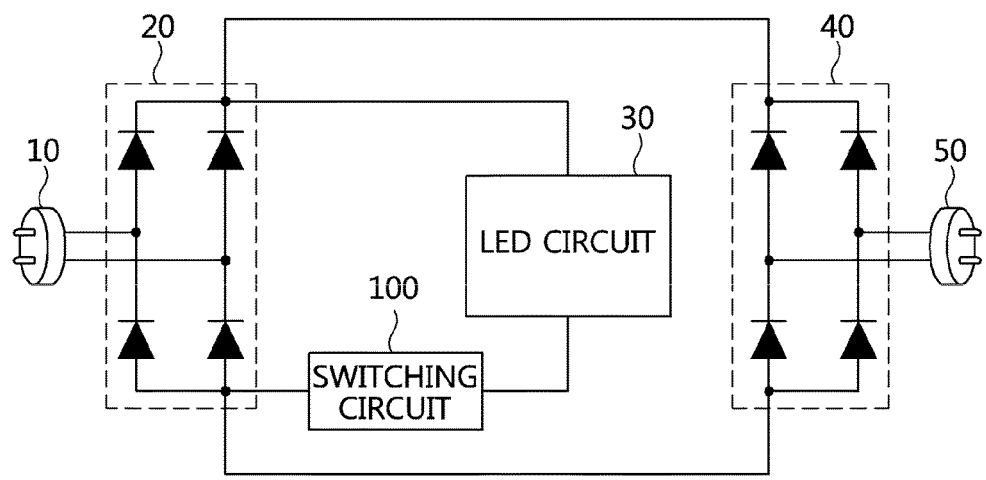
FIGS. 4 to 6 are views for describing an LED lamp using a switching circuit according to an embodiment of the present invention.
Figure 5:
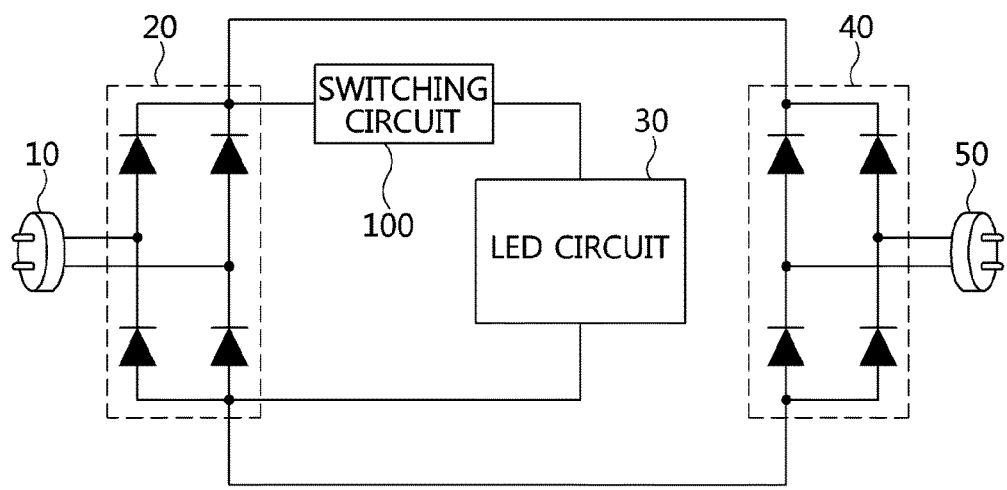
Figure 6:
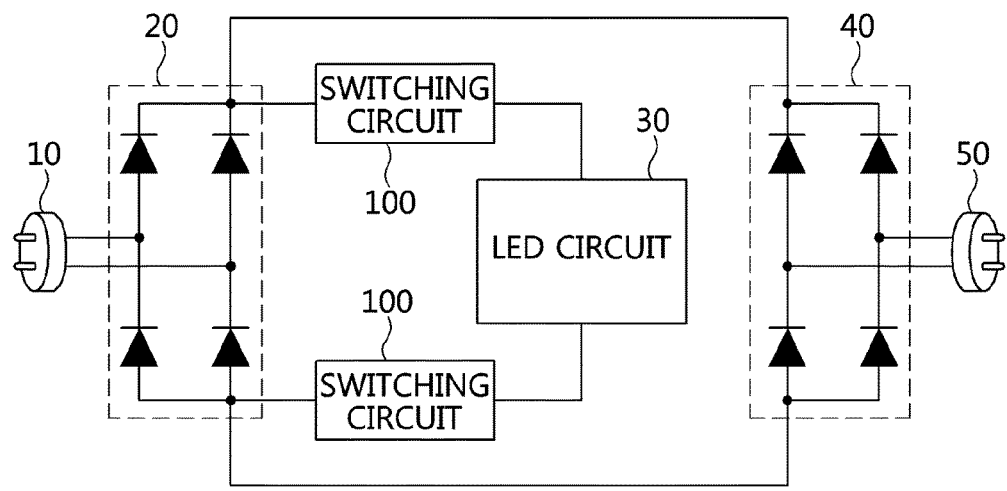

FIG. 1 is a view for describing a general LED lamp, and FIG. 2 is a view for describing a conventional LED lamp using an electric circuit. FIGS. 4 to 6 are views for describing an LED lamp using a switching circuit according to an embodiment of the present invention.

As illustrated in FIG. 1, an LED lamp is configured to include a first input base 10, a first rectifier circuit 20, an LED circuit 30, a second rectifier circuit 40 and a second input base 50. Here, in the case of the LED lamp, when the terminal of the first input base 10 is connected with a ballast, leakage current occurs. Specifically, in the case of the LED lamp, the LED circuit 30 (that is, an LED converter (not illustrated) embedded in the LED circuit 30) lets the AC power applied through the terminal of the first input base 10 pass therethrough and leak to the terminal of the second input base 50, whereby leakage current occurs. In this case, if the terminal of the second input base 50 is grounded to a human body or conductive metal, resistance R3 is generated, and the leakage current flows to the human body or the conductive metal, whereby the user may be subjected to an electric shock.

Meanwhile, an LED lamp using an electric circuit, illustrated in FIG. 2, has been developed in order to replace a conventional LED lamp using a mechanical switch. The LED lamp using an electric circuit is configured such that multiple resistors R1 and R2, connected in series with each other, are connected in parallel with a rectifier circuit and an LED circuit 30 therebetween and such that a switch is connected in series with the rectifier circuit and the LED circuit 30 therebetween. The LED lamp using the electric circuit determines whether a human body or conductive metal is in contact therewith based on the voltage that is applied to the multiple resistors as a result of the application of operating power, and when it is determined that such contact occurs, the flow of leakage current is blocked through the operation of the switch.

However, in the case of the LED lamp using the electric circuit, assuming that operating power Vin ranging from about 220 V to 240 V is applied, the voltage Vpeak at the multiple resistors ranges from about 282.8 V to 339.4 V in a normal state (that is, in the state of no contact with a human body), and the voltage sensed in the event of an electric shock (that is, in the state of contact with a human body) ranges from about 254.5 V to 305.4 V, as illustrated in FIG. 3. That is, in the case of the LED lamp using the electric circuit, because the voltage measured in the normal state and the voltage measured in the event of an electric shock have an overlapping range (from 282.8 V to 305.4 V), it is difficult to accurately determine whether a human body or conductive metal contacts the LED lamp. Here, R3 corresponds to the human body or the conductive metal, and V2 indicates the voltage at R3.

Meanwhile, in an LED lamp using a switching circuit 100 according to an embodiment of the present invention, the switching circuit 100 is arranged between a first rectifier circuit 20 and an LED circuit 30, whereby an electric shock attributable to contact with a user may be prevented. To this end, as illustrated in FIG. 4, the LED lamp using the switching circuit 100 is configured to include a first input base 10, a first rectifier circuit 20, the switching circuit 100, an LED circuit 30, a second rectifier circuit 40 and a second input base 50. Here, the switching circuit 100 is connected to the line that connects the first rectifier circuit 20 with the anode terminal of the LED circuit 30. Also, as illustrated in FIG. 5, the switching circuit 100 may be connected to the line that connects the first rectifier circuit 20 with the cathode terminal of the LED circuit 30. Alternatively, as illustrated in FIG. 6, two switching circuits 100 may be connected to the line that connects the first rectifier 20 with the anode terminal of the LED circuit 30 and the line that connects the first rectifier 20 with the cathode terminal of the LED circuit 30, respectively.

FIGS. 7 to 10 are views for describing a switching circuit in an LED lamp using the switching circuit 100 according to an embodiment of the present invention.

Figure 7:
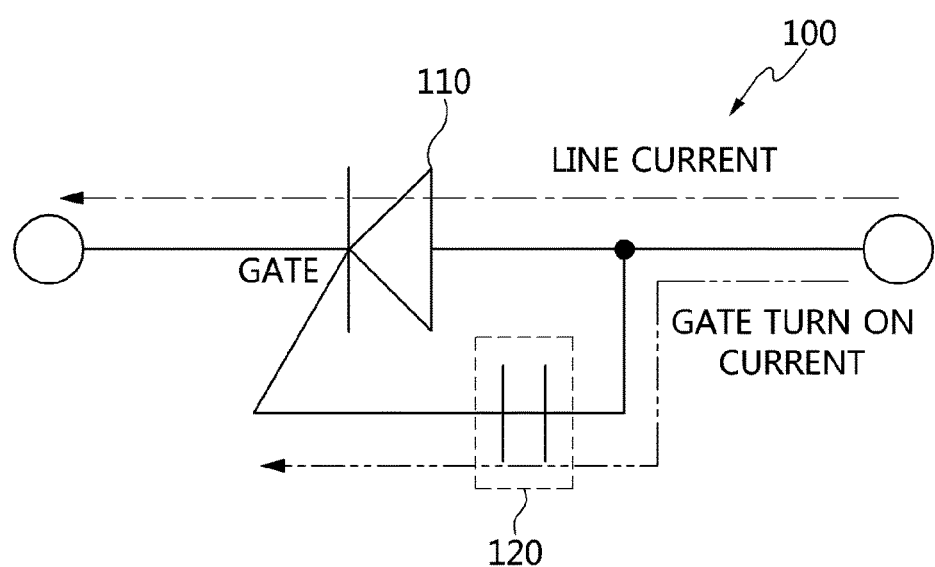
FIGS. 7 to 10 are views for describing a switching circuit in an LED lamp using the switching circuit according to an embodiment of the present invention.
Figure 8:
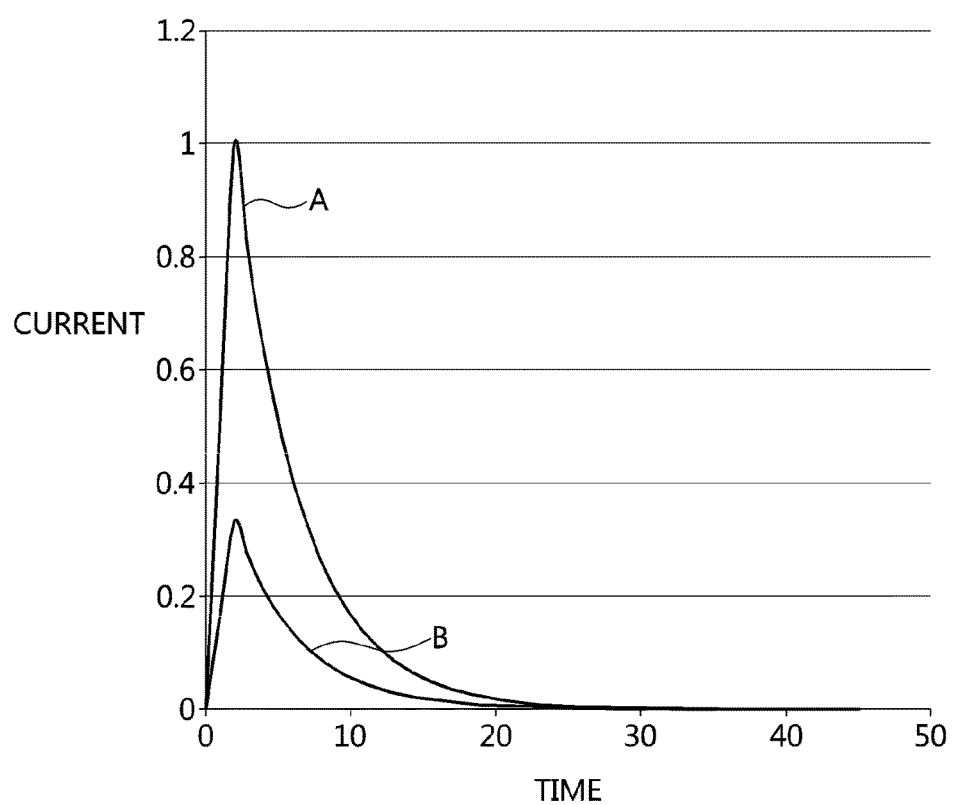

For example, as illustrated in FIG. 7, the switching circuit 100 is configured to include a switching element 110 and a driving element 120. The switching element 110 is configured such that the first end thereof is connected to a first rectifier circuit 20 and the second end thereof is connected to an LED circuit 30. The driving element 120 is connected in parallel with the switching element in such a way that the first end thereof is connected to the first end of the switching element 110 and the second end thereof is connected with the LED circuit 30 and with the second end of the switching element 110. Here, the switching element 110 may be configured as an element that connects a circuit when a current (or a voltage) equal to or greater than a reference current (or a reference voltage) is applied but disconnects the circuit when a current (or a voltage) less than the reference current (or the reference voltage) is applied, such as a Silicon-Controlled Rectifier (SCR), a TRIAC, a Transistor (TR), a Field Effect Transistor (FET) or the like. Also, the driving element 120 may be configured with a condenser, a Transient Voltage Suppressor (TVS) diode, a ZENER diode, a Silicon Diode Alternating Current (SIDAC) switch, a resistor, an inductor, or the like.

Here, if operating power is applied to the LED lamp using the switching circuit 100 in a normal state, a current (A in FIG. 8) that is equal to or greater than the reference current is temporarily applied to the switching element 110 in the state in which the internal resistance of the driving element 120 is 0Ω. Accordingly, the gate of the switching element 110 is turned on, and thus a normal line current flows, whereby the turned-on state of the switching element 110 is maintained and the current is applied to the LED circuit 30.

Meanwhile, if operating power is applied to the LED lamp using the switching circuit 100 in the event of an electric shock, about 50 kΩ resistance is generated due to the contact of the human body or conductive metal with the second input base 50. In this case, due to the 50 kΩ resistance generated from the human body or conductive metal, a current (B in FIG. 8) less than the reference current is applied to the switching element 110. Accordingly, the gate of the switching element 110 maintains the turned-off state. Also, even if the gate is turned on once, a line current has a low value due to the 50 kΩ resistance, which was generated from the human body or conductive metal, and thus the turned-on state may not be maintained, whereby leakage current is prevented from being applied to the human body or conductive metal.

Figure 9:
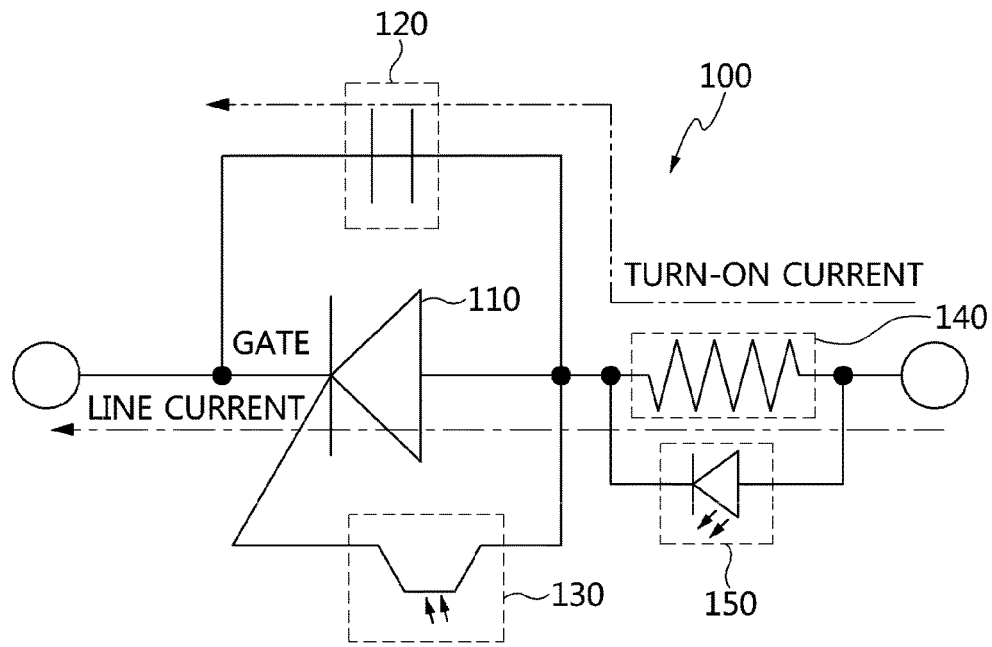

In another example, the switching circuit 100 is configured to include a switching element 110, a driving element 120, a photo-coupler 130, a resistor 140 and a light-emitting diode 150, as illustrated in FIG. 9.

The switching element 110 is configured such that the first end thereof is connected with a first rectifier circuit 20 and the driving element 120 and such that the second end thereof is connected with the driving element 120, the photo-coupler 130 and the resistor 140. The driving element 120 is configured such that the first end thereof is connected with the first rectifier circuit 20, the switching element 110 and the photo-coupler 130 and such that the second end thereof is connected with the switching element 110, the photo-coupler 130 and the resistor 140, so that the driving element is connected in parallel with the switching element 110. The photo-coupler 130 is configured such that the first end thereof is connected with the switching element 110 and such that the second end thereof is connected with the switching element 110, the driving element 120 and the resistor 140. The resistor 140 is configured such that the first end thereof is connected with the switching element 110, the driving element 120 and the photo-coupler 130 and such that the second end thereof is connected with an LED circuit 30. Here, the light-emitting diode 150 is connected in parallel with the resistor 140.

Here, if operating power is applied to the LED lamp using the switching circuit 100 in a normal state, first, a line current flows once through the driving element 120, which is connected in parallel with the switching element 110. At this time, the photo-coupler 130 operates, and thus a signal is applied to the gate of the switching element 110. Accordingly, the switching element 110 is turned on, and a normal line current flows, whereby the turned-on state of the switching element 110 is maintained and the current is applied to the LED circuit 30.

Meanwhile, if operating power is applied to the LED lamp using the switching circuit 100 in the event of an electric shock, about 50 kΩ resistance is generated due to the contact of the human body or conductive metal with the second input base 50. In this case, the switching element 110 is in the turned-off state, and the 50 kΩ resistance, generated from the human body or conductive metal, impedes the operation of the photo-coupler 130. Even if the switching element 110 is turned on because a line current flows once, the line current has a low value due to the 50 kΩ resistance, generated from the human body or conductive metal, and thus the turned-on state may not be maintained, whereby leakage current is prevented from being applied to the human body or conductive metal.

Figure 10:
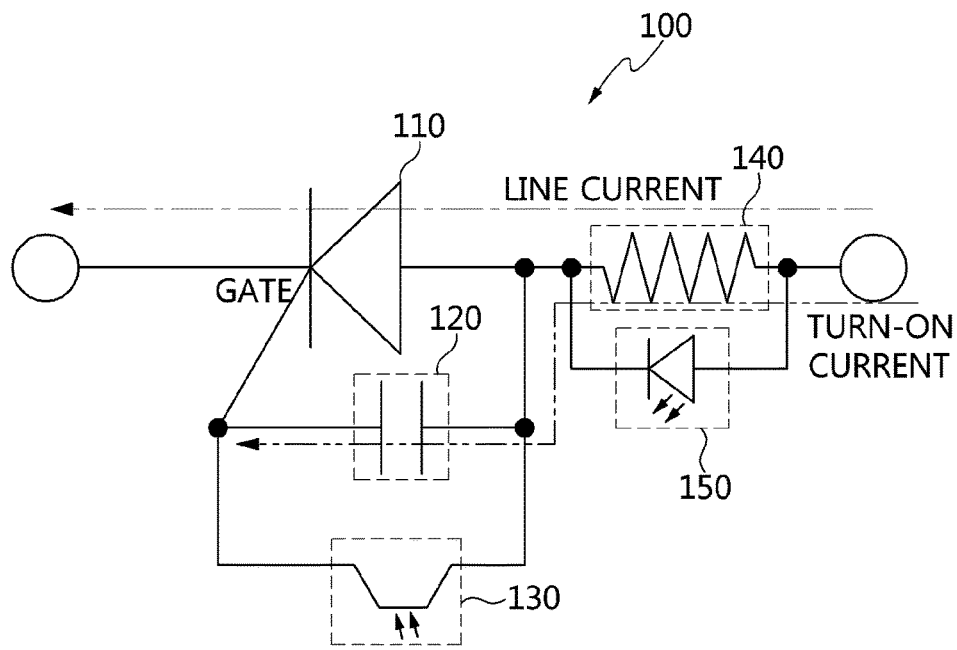

In other example, the switching circuit 100 is configured to include a switching element 110, a driving element 120, a photo-coupler 130, a resistor 140 and a light-emitting diode 150, as illustrated in FIG. 10.

The switching element 110 is configured such that the first end thereof is connected with a first rectifier circuit 20 and the driving element 120 and such that the second end thereof is connected with the driving element 120, the photo-coupler 130 and the resistor 140. The driving element 120 is configured such that the first end thereof is connected with the first rectifier circuit 20, the switching element 110 and the photo-coupler 130 and such that the second end thereof is connected with the switching element 110, the photo-coupler 130 and the resistor 140, so that the driving element is connected in parallel with the switching element 110. The photo-coupler 130 is configured such that the first end thereof is connected with the switching element 110 and the driving element 120 and such that the second end thereof is connected with the switching element 110, the driving element 120 and the resistor 140, so that the photo-coupler is connected in parallel with the switching element 110 and the driving element 120. The resistor 140 is configured such that the first end thereof is connected with the switching element 110, the driving element 120 and the photo-coupler 130 and such that the second end thereof is connected with an LED circuit 30. Here, the light-emitting diode 150 is connected in parallel with the resistor 140.

Here, if operating power is applied to the LED lamp using the switching circuit 100 in a normal state, a current (A in FIG. 8) that is equal to or greater than the reference current is temporarily applied to the switching element 110 in the state in which the internal resistance of the driving element 120 is 0Ω. Accordingly, the gate of the switching element 110 is turned on, and thus a normal line current flows, whereby the turned-on state of the switching element 110 is maintained and the current is applied to the LED circuit 30. Here, the photo-coupler 130 continuously applies a signal to the gate of the switching element 110 after the switching element 110 is turned on, whereby the turned-on state of the switching element 110 is more stably maintained than when using the switching element 100 described in FIG. 7.

Meanwhile, if operating power is applied to the LED lamp using the switching circuit 100 in the event of an electric shock, about 50 kΩ resistance is generated due to the contact of the human body or conductive metal with the second input base 50. In this case, due to the 50 kΩ resistance generated from the human body or conductive metal, a current (B in FIG. 8) less than the reference current is applied to the switching element 110. Accordingly, the gate of the switching element 110 maintains the turned-off state. Also, even if the gate is turned on once, a line current has a low value due to the 50 kΩ resistance generated from the human body or conductive metal, and thus the turned-on state may not be maintained, whereby a leakage current is prevented from being applied to the human body or conductive metal.

Figure 11:
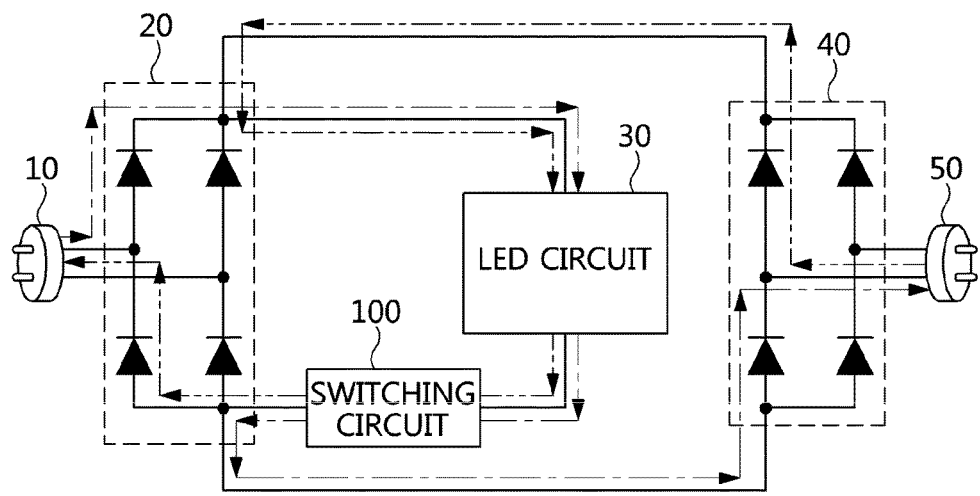
FIGS. 11 and 12 are views for describing the operation of an LED lamp using a switching circuit according to an embodiment of the present invention.
Figure 12:
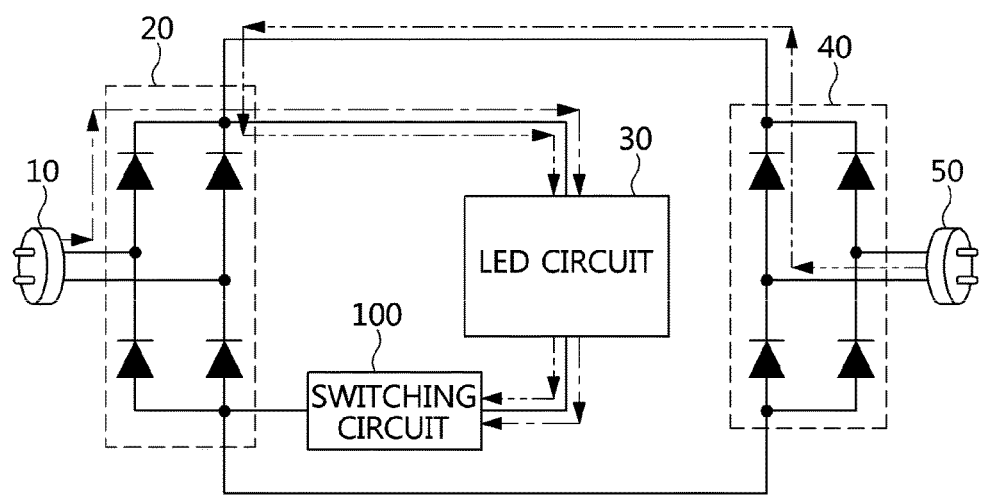

FIG. 11 and FIG. 12 are views for describing the operation of an LED lamp using a switching circuit 100 according to an embodiment of the present invention.

As illustrated in FIG. 11, if operating power is applied to an LED lamp using a switching circuit 100 in a normal state, the switching circuit 100 maintains a turned-on state and current is applied to the LED circuit 30.

On the other hand, as illustrated in FIG. 12, if operating power is applied to the LED lamp using a switching circuit 100 in the event of an electric shock, that is, when about 50 kΩ resistance is generated due to contact of a human body or conductive metal with the second input base 50, the switching circuit 100 blocks the flow of current, whereby leakage current is prevented from being applied to the human body or the conductive metal.

Figure 13:
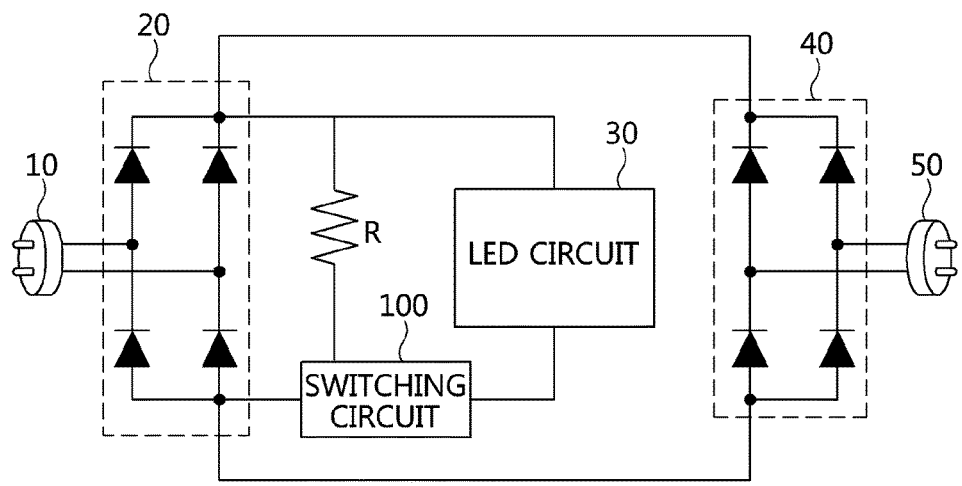

FIG. 13 is a view for describing a modification of the LED lamp using a switching circuit 100 according to an embodiment of the present invention.

As illustrated in FIG. 13, the LED lamp using the switching circuit 100 may be configured to include the switching circuit 100 arranged on the line that connects a first rectifier circuit 20 and an LED circuit 30 and to further include a resistor R connected to another line that connects the first rectifier circuit 20 and the LED circuit 30. Here, the resistor R is configured as a resistor having a resistance value of about hundreds of kΩ. Accordingly, the LED lamp using the switching circuit 100 amplifies a signal using the resistor R, and thereby stably maintains the switching circuit 100 in a turned-on state.

Figure 14:
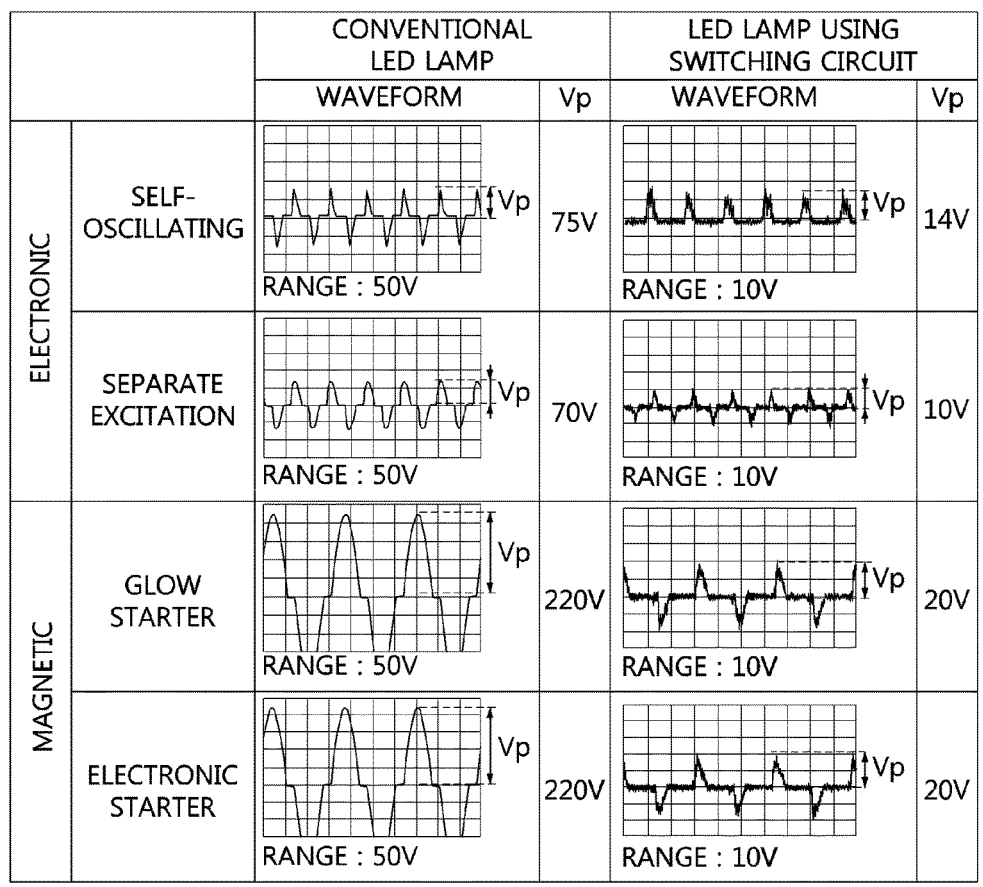
FIG. 14 is a view for comparing a conventional LED lamp with an LED lamp using a switching circuit according to an embodiment of the present invention.

FIG. 14 is a view for comparing a conventional LED lamp and an LED lamp using a switching circuit according to an embodiment of the present invention.

When a conventional LED lamp is installed so as to be connected with a separate-excitation electronic ballast, about 75 V peak voltage is generated at the terminal of the LED lamp, but when an LED lamp using a switching circuit is installed in place of a conventional LED lamp, about 14 V peak voltage is generated at the terminal of the LED lamp.

When the conventional LED lamp is installed so as to be connected with a self-oscillating electronic ballast, about 70 V peak voltage is generated at the terminal of the LED lamp, but when the LED lamp using a switching circuit is installed in place of a conventional LED lamp, about 10 V peak voltage is generated at the terminal of the LED lamp.

When the conventional LED lamp is installed so as to be connected with a magnetic glow starter-type ballast, about 220 V peak voltage is generated at the terminal of the LED lamp, but when the LED lamp using a switching circuit is installed in place of a conventional LED lamp, about 20 V peak voltage is generated at the terminal of the LED lamp.

When a conventional LED lamp is installed so as to be connected with a magnetic ballast and an electronic starter, about 220 V peak voltage is generated at the terminal of the LED lamp, but when the LED lamp using a switching circuit is installed in place of a conventional LED lamp, about 20 V peak voltage is generated at the terminal of the LED lamp.

As described above, when the conventional LED lamp is installed so as to be connected with various types of ballasts, which are the currently used, because a peak voltage that ranges about from 70 V to 220 V is generated, an electric shock or a shock current occurs when a human body or conductive metal contacts the LED lamp. However, when the LED lamp using a switching circuit is installed, the peak voltage is maintained below 20 V, whereby the occurrence of an electric shock attributable to the contact of a human body or conductive metal with the LED lamp may be prevented.

As described above, because the LED lamp using a switching circuit is configured such that the switching circuit is arranged between a first rectifier circuit and an LED circuit, the occurrence of an electric shock attributable to the contact of a human body part or conductive metal with the LED lamp may be prevented.

Also, because the LED lamp using a switching circuit is configured such that the switching circuit is arranged between a first rectifier circuit and an LED circuit, the LED lamp may be stably operated by switching a DC line having little ripple, which is connected to the rectifier.

Also, because the LED lamp using a switching circuit is configured such that the switching circuit is arranged between a first rectifier circuit and an LED circuit, the operational characteristics may be improved when input voltage has a wide range.

Also, because the LED lamp using a switching circuit is configured such that the switching circuit is arranged between a first rectifier circuit and an LED circuit, it is possible to solve problems related to contact, such as contact failure resulting from vibration, deterioration and the like, which occur in a conventional LED lamp using a mechanical switch.

Also, because the LED lamp using a switching circuit is configured such that the switching circuit is arranged between a first rectifier circuit and an LED circuit, a circuit for protection from electric shocks may be simply configured, and the function of protection from electric shocks may be improved.

Also, because the LED lamp using a switching circuit is configured such that the switching circuit is arranged between a first rectifier circuit and an LED circuit, the operation of a switching element may be controlled by controlling a cut-off voltage depending on a clamping voltage through a driving element.

Also, because the LED lamp using a switching circuit is configured such that the switching circuit is arranged between a first rectifier circuit and an LED circuit, the function of protection from electric shocks may be improved compared to a conventional LED lamp, and flickering may be prevented.

Although the preferred embodiment of the present invention has been disclosed, the present invention may be changed in various forms, and those skilled in the art will appreciate that various modifications, additions and substitutions are possible, without departing from the scope and spirit of the invention as disclosed in the accompanying claims.

The invention claimed is:

1. An LED lamp using a switching circuit, comprising:
   a first input base on which a first terminal and a second terminal are formed;
   a first rectifier circuit, which includes one or more diodes and is connected with the first terminal and the second terminal of the first input base;
   an LED circuit, which includes one or more LEDs and is connected with the first rectifier circuit;
   a second rectifier circuit, which includes one or more diodes and is connected with the LED circuit;
   a second input base on which a third terminal and a fourth terminal are formed, the third terminal and the fourth terminal being connected with the second rectifier circuit; and the switching circuit, connected with at least one line that connects the first rectifier circuit and the LED circuit,
   wherein the switching circuit comprises:
   a switching element, a first end of which is connected with the first rectifier and a second end of which is connected with the LED circuit;
   a driving element connected in parallel with the switching element in such a way that a first end thereof is connected with the first end of the switching element and a second end thereof is connected with the second end of the switching element and the LED circuit;
a photo-coupler, a first end of which is connected with the first end of the switching element and a second end of which is connected with the second end of the switching element and the second end of the driving element;
a resistor, a first end of which is connected with the second end of the switching element, the second end of the driving element and the second end of the photo-coupler and a second end of which is connected with the LED circuit; and
a light-emitting diode connected in parallel with the resistor in such a way that a first end thereof is connected with the first end of the resistor and a second end thereof is connected with the second end of the resistor.

2. The LED lamp of the claim 1, wherein the switching circuit is connected with at least one of a line that connects the first rectifier circuit with an anode terminal of the LED circuit and a line that connects the first rectifier circuit with a cathode terminal of the LED circuit.

3. The LED lamp of the claim 1, wherein:
the switching element includes at least one of a Silicon-Controlled Rectifier (SCR), a TRIAC, a transistor (TR), a Field Effect Transistor (FET), and
the driving element includes at least one of a condenser, a Transient Voltage Suppressor (TVS) diode, a ZENER diode, a Silicon Diode Alternating Current (SIDAC) switch, a resistor, and an inductor.

4. The LED lamp of the claim 1, wherein the photo-coupler is connected in parallel with the switching element and the driving element in such a way that the first end thereof is connected with the first end of the switching element and the first end of the driving element and the second end thereof is connected with the second end of the switching element and the second end of the driving element.

* * * * *